J. R. ROGERS.
TYPOGRAPHICAL MACHINE.
APPLICATION FILED JAN. 7, 1914.

1,154,057.

Patented Sept. 21, 1915.
13 SHEETS—SHEET 1.

J. R. ROGERS.
TYPOGRAPHICAL MACHINE.
APPLICATION FILED JAN. 7, 1914.

1,154,057.

Patented Sept. 21, 1915.
13 SHEETS—SHEET 3.

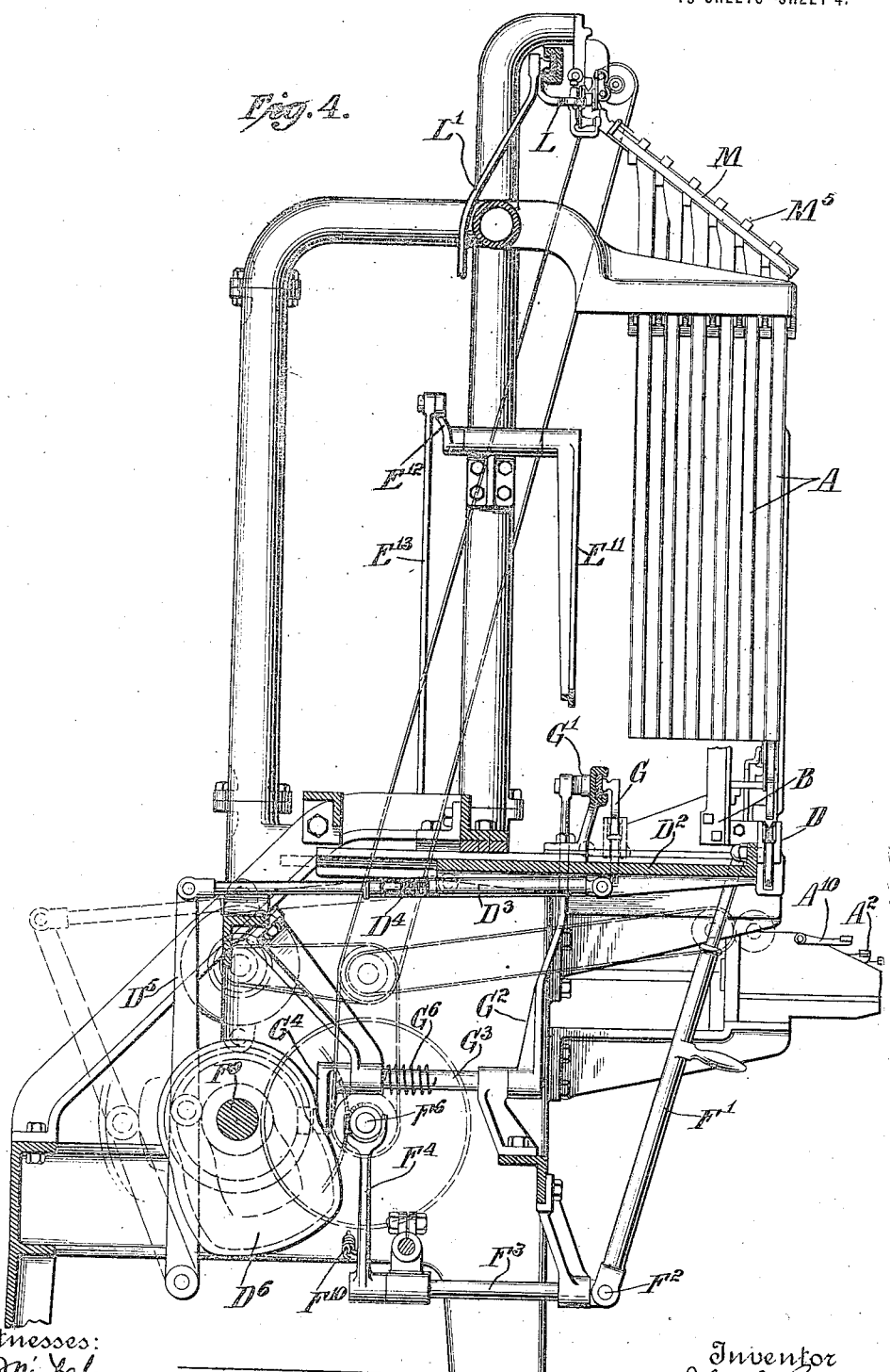

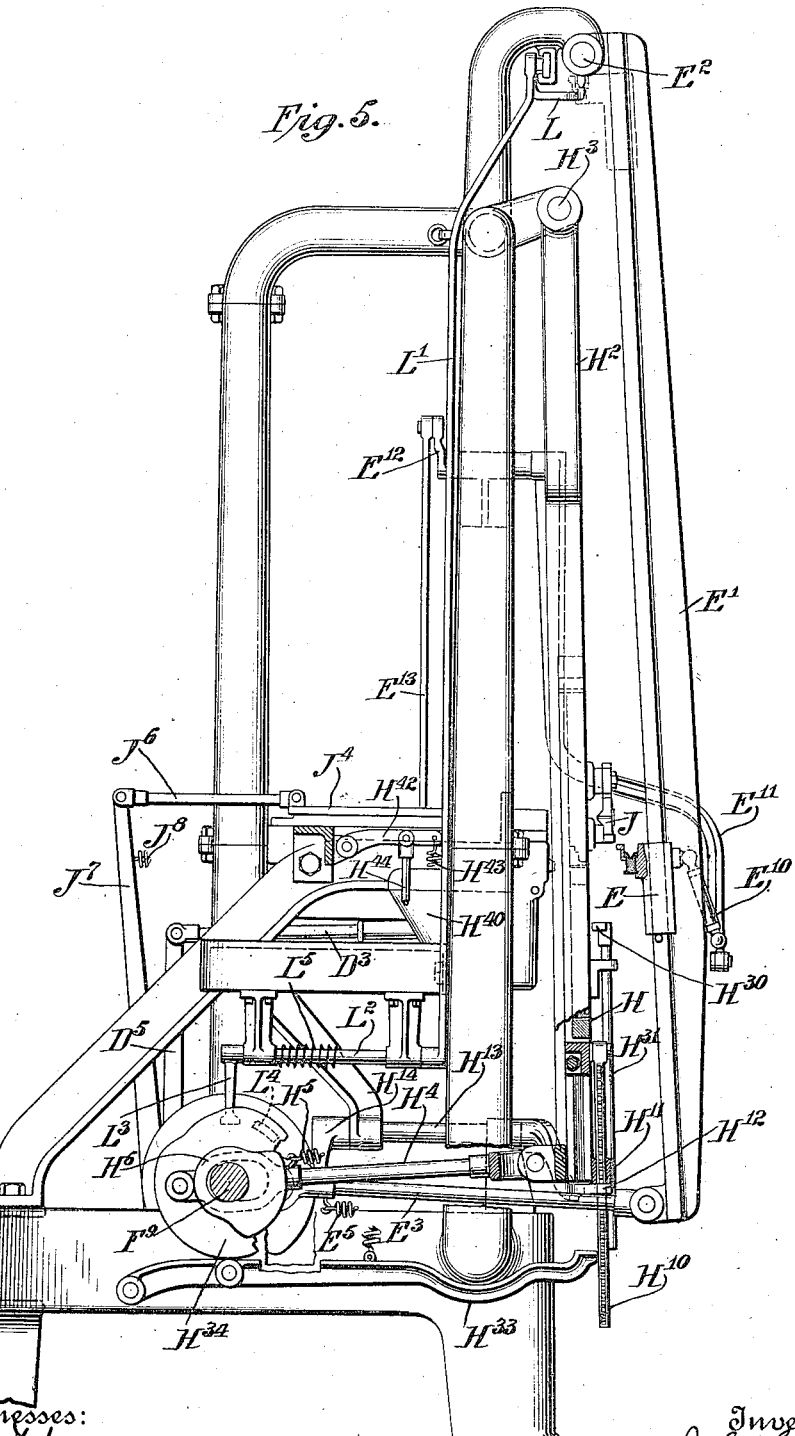

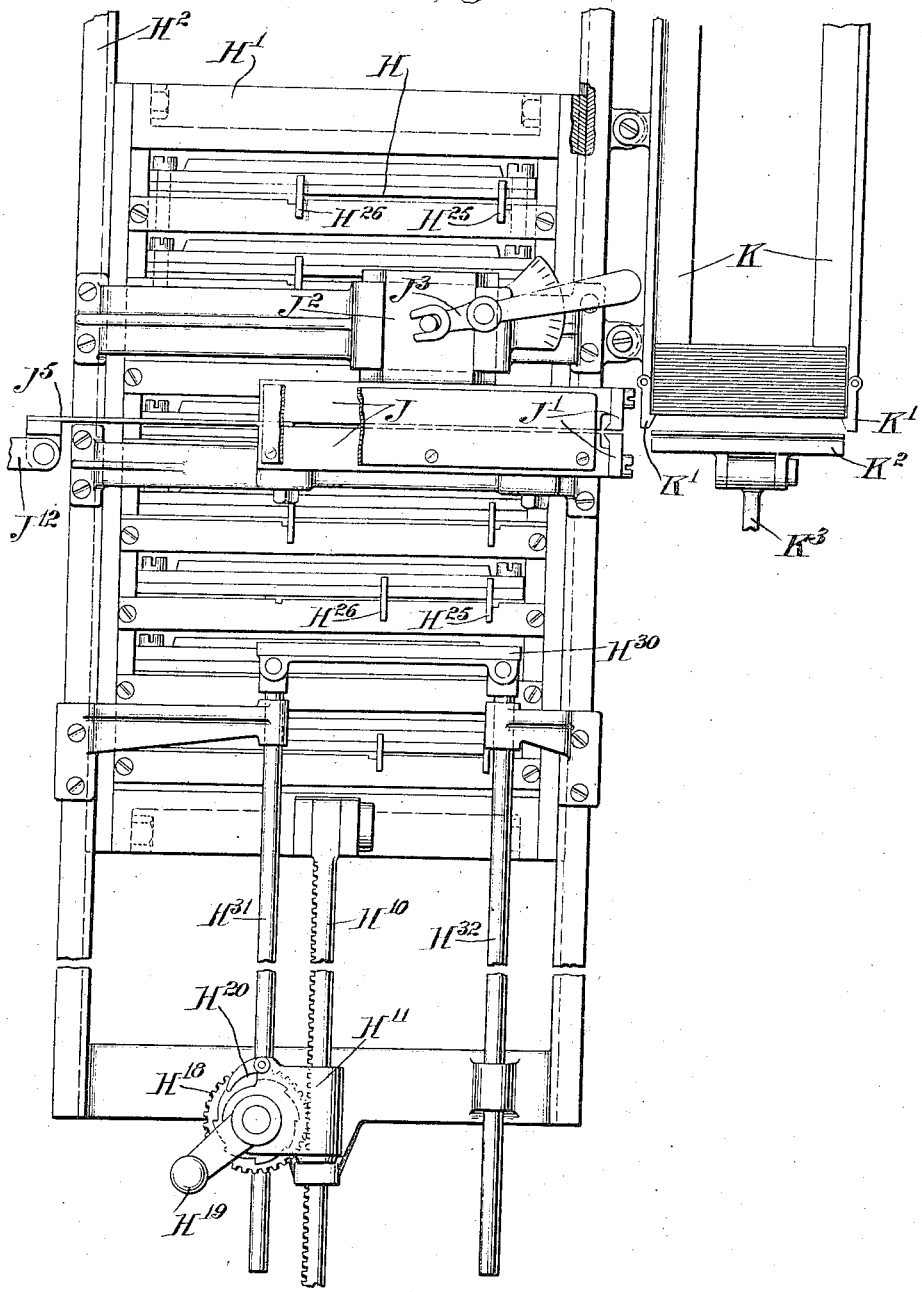

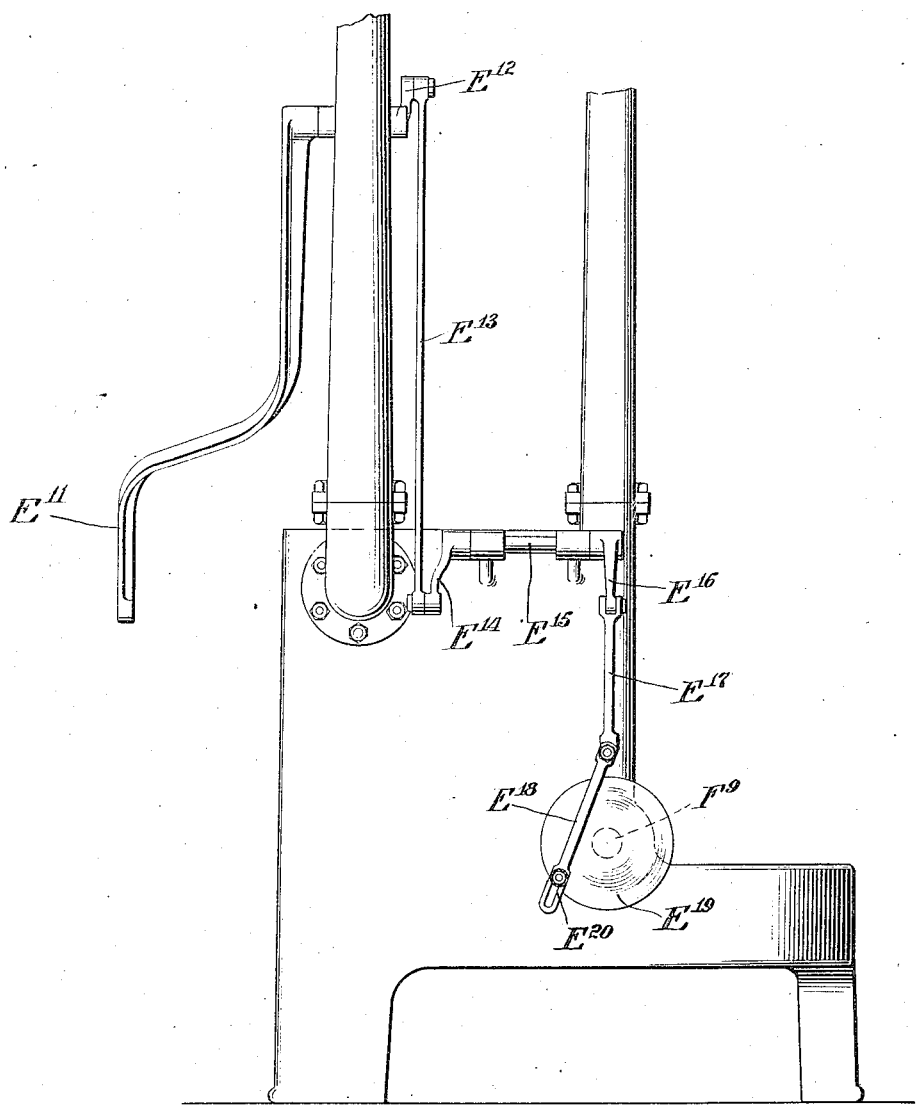

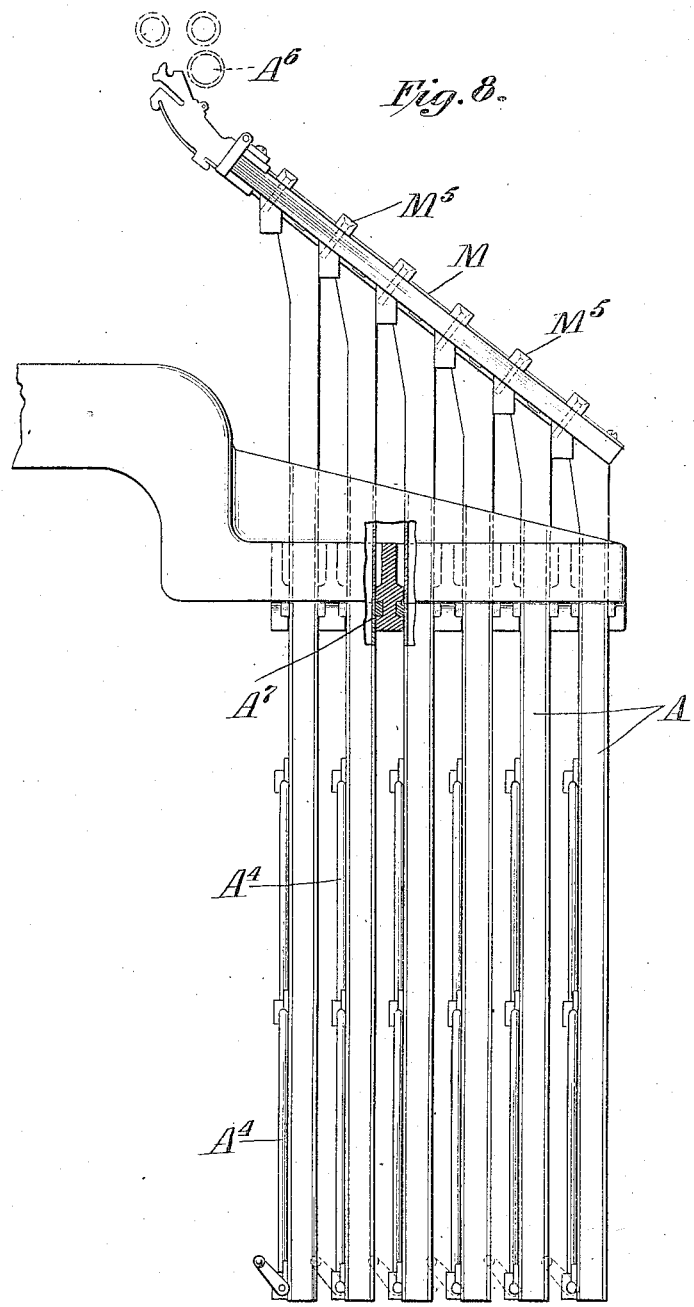

J. R. ROGERS.
TYPOGRAPHICAL MACHINE.
APPLICATION FILED JAN. 7, 1914.
1,154,057.
Patented Sept. 21, 1915.
13 SHEETS—SHEET 9.
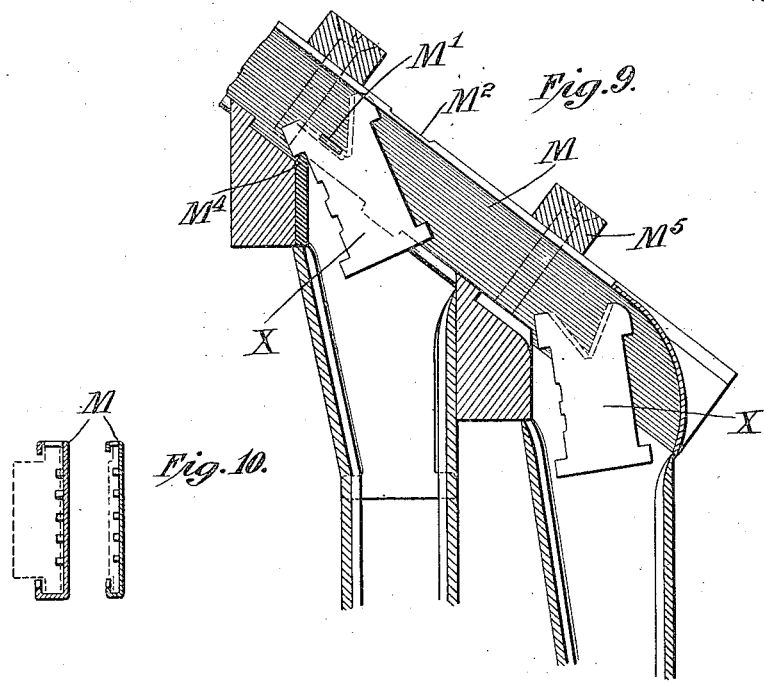
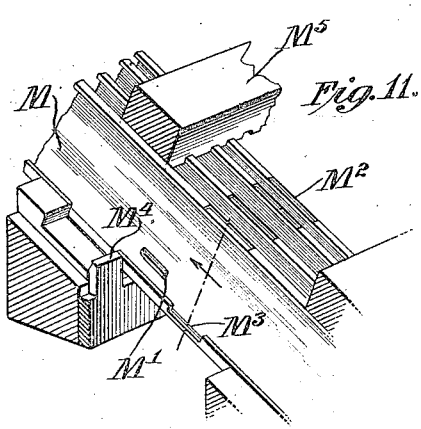
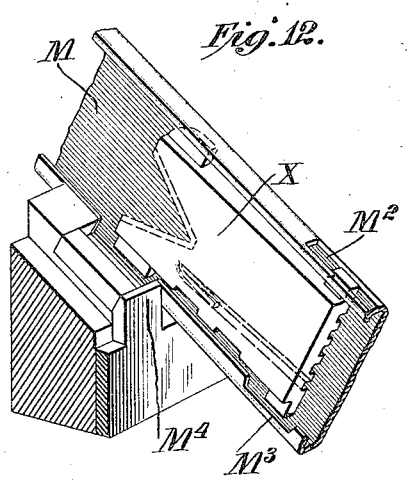

J. R. ROGERS.
TYPOGRAPHICAL MACHINE.
APPLICATION FILED JAN. 7, 1914.

1,154,057.

Patented Sept. 21, 1915.
13 SHEETS—SHEET 12.

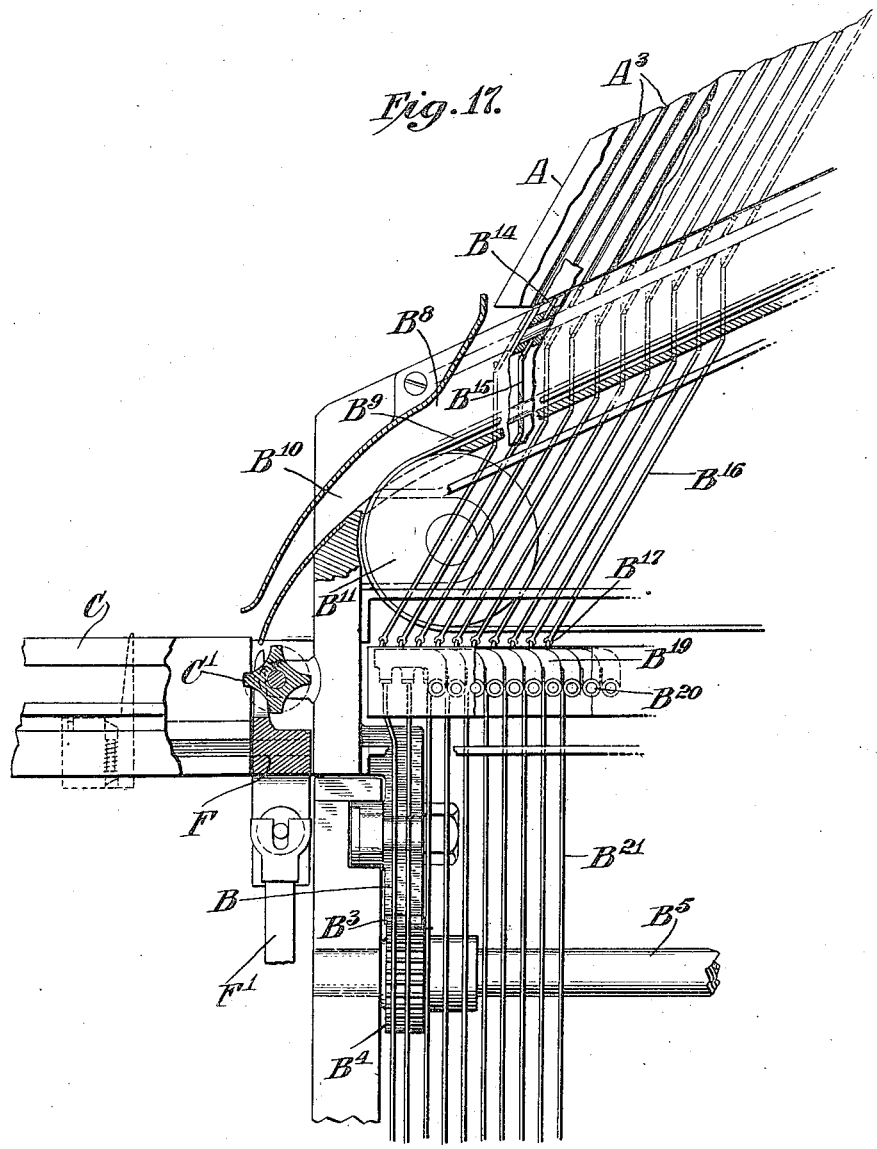

UNITED STATES PATENT OFFICE.

JOHN R. ROGERS, OF BROOKLYN, NEW YORK, ASSIGNOR TO MERGENTHALER LINOTYPE COMPANY, A CORPORATION OF NEW YORK.

TYPOGRAPHICAL MACHINE.

1,154,057.  Specification of Letters Patent.  Patented Sept. 21, 1915.

Application filed January 7, 1914. Serial No. 810,750.

*To all whom it may concern:*

Be it known that I, JOHN R. ROGERS, a citizen of the United States, residing at Brooklyn, in the county of Kings and State of New York, have invented certain new and useful Improvements in Typographical Machines, of which the following is a specification, reference being had therein to the accompanying drawing.

My invention relates to typographical machines, such as linotype machines of the general organization represented in Letters Patent of the United States, No. 436,532, to O. Mergenthaler, wherein circulating matrices are released from a magazine or magazines in the order in which their characters are to appear in print, and then assembled in line together with expansible spacers, the composed line transferred to the face of a mold, the mold filled with molten metal to form a slug or linotype against the matrices which produce the type characters thereon, and the matrices thereafter returned through distributing mechanism to the magazine or magazines from which they started.

More particularly, it relates to that class thereof equipped with a plurality of fonts of matrices, any selected one of which may be brought into action at will.

As my improved devices involve the practical reorganization of the machine, they will be discussed in the description which follows, and finally pointed out in the claims.

In the accompanying drawings, they are illustrated as applied to the specific form of machine already mentioned, but obviously many changes and variations may be made therein, and in their mode of application, which will still be comprised within the spirit of the invention; for instance, they may be adapted to other styles of typographical machines, such as typesetters, typecasters, and the like, which handle type or dies, instead of matrices.

Generally speaking, I desire it to be understood that I do not limit myself to any specific form or embodiment, except in so far as such limitations are specified in the claims.

Figure 1:
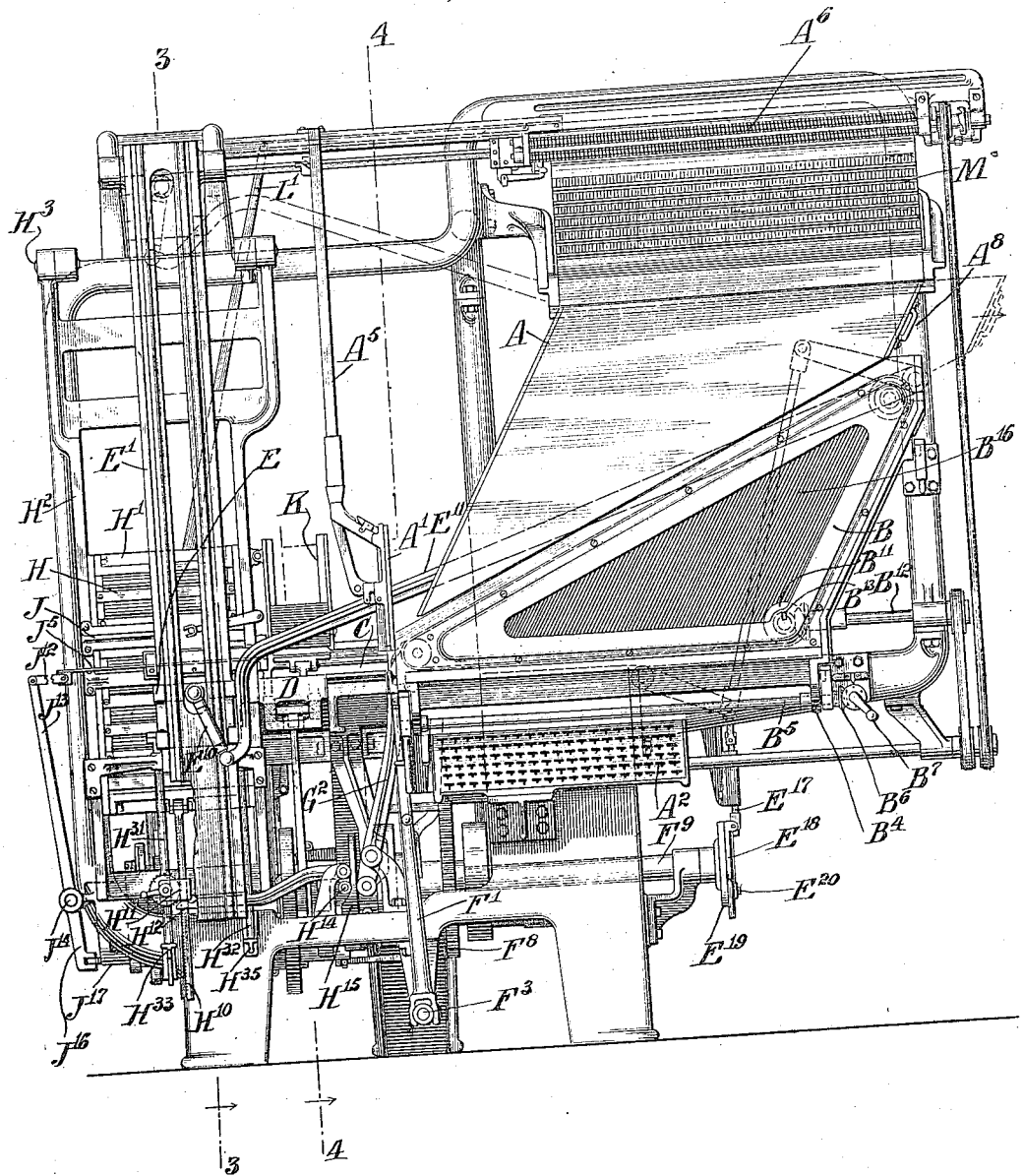
Figure 2:
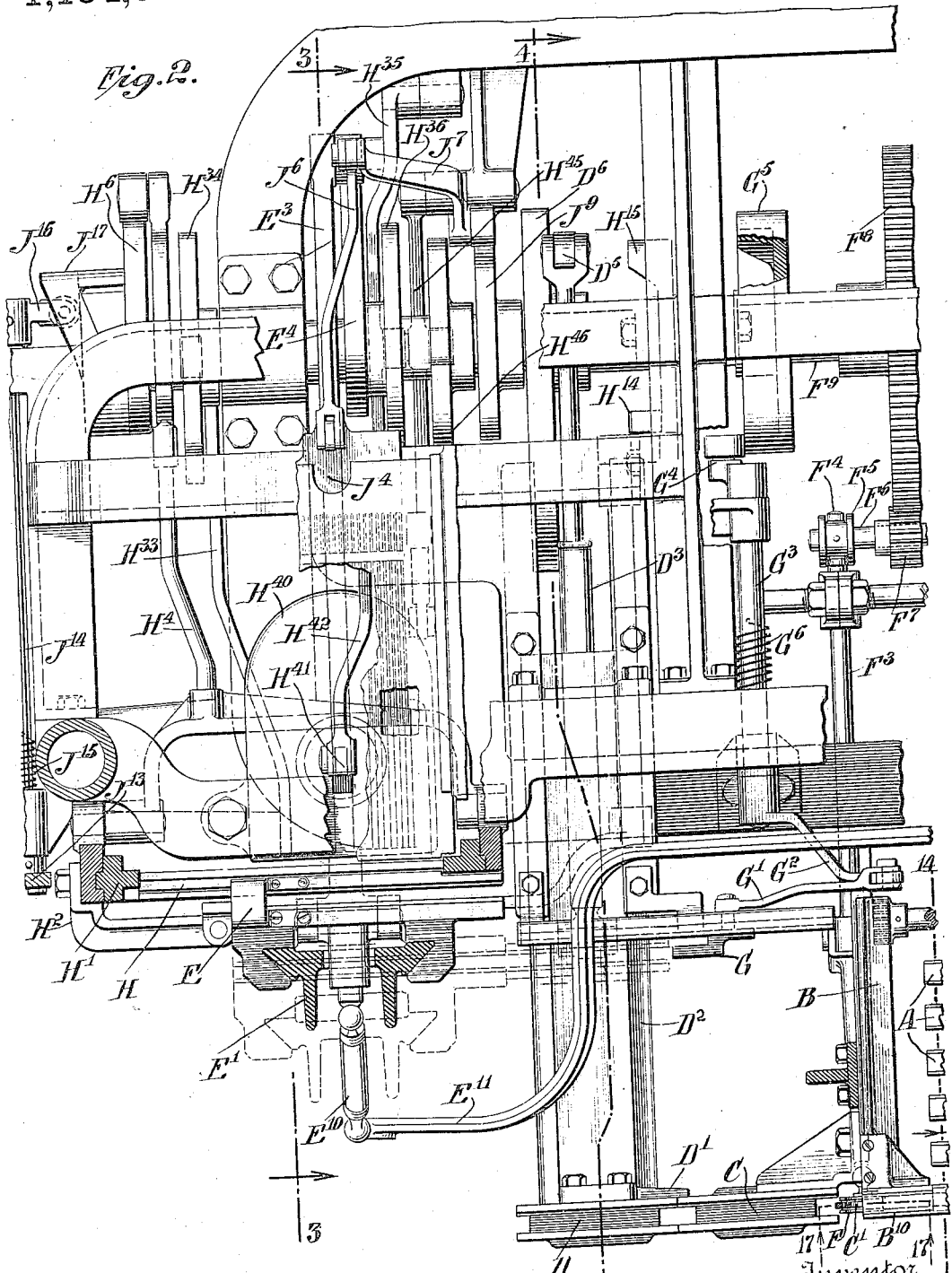
Figure 3:
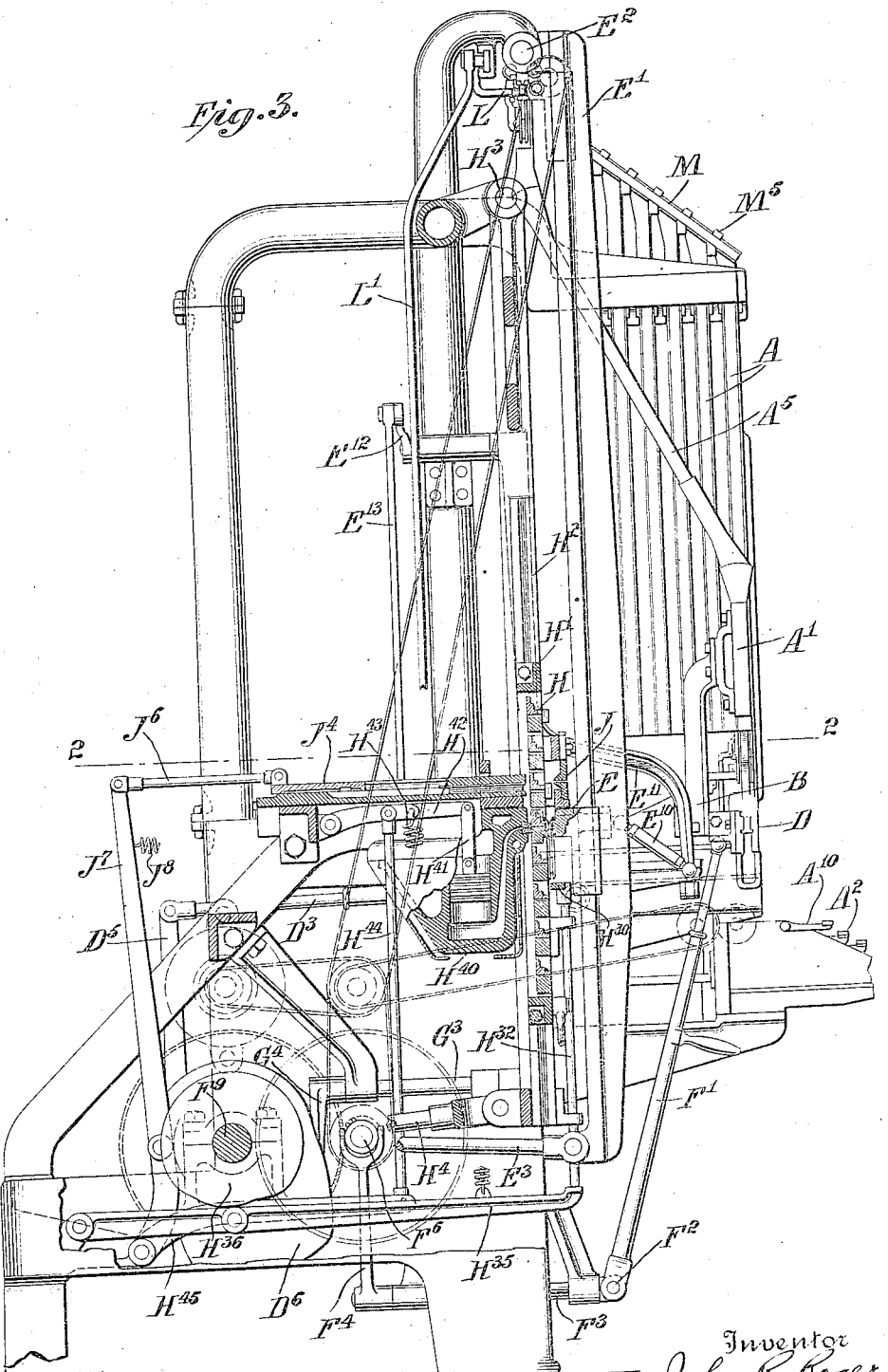
Figure 13:
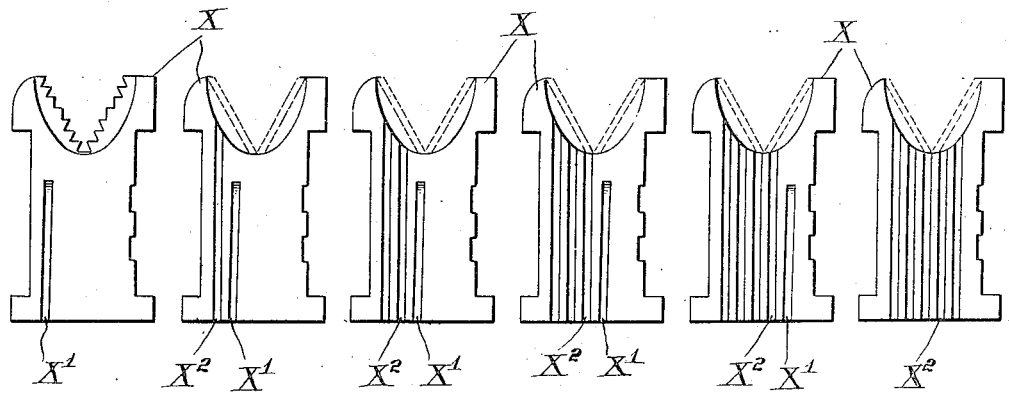
Figure 14:
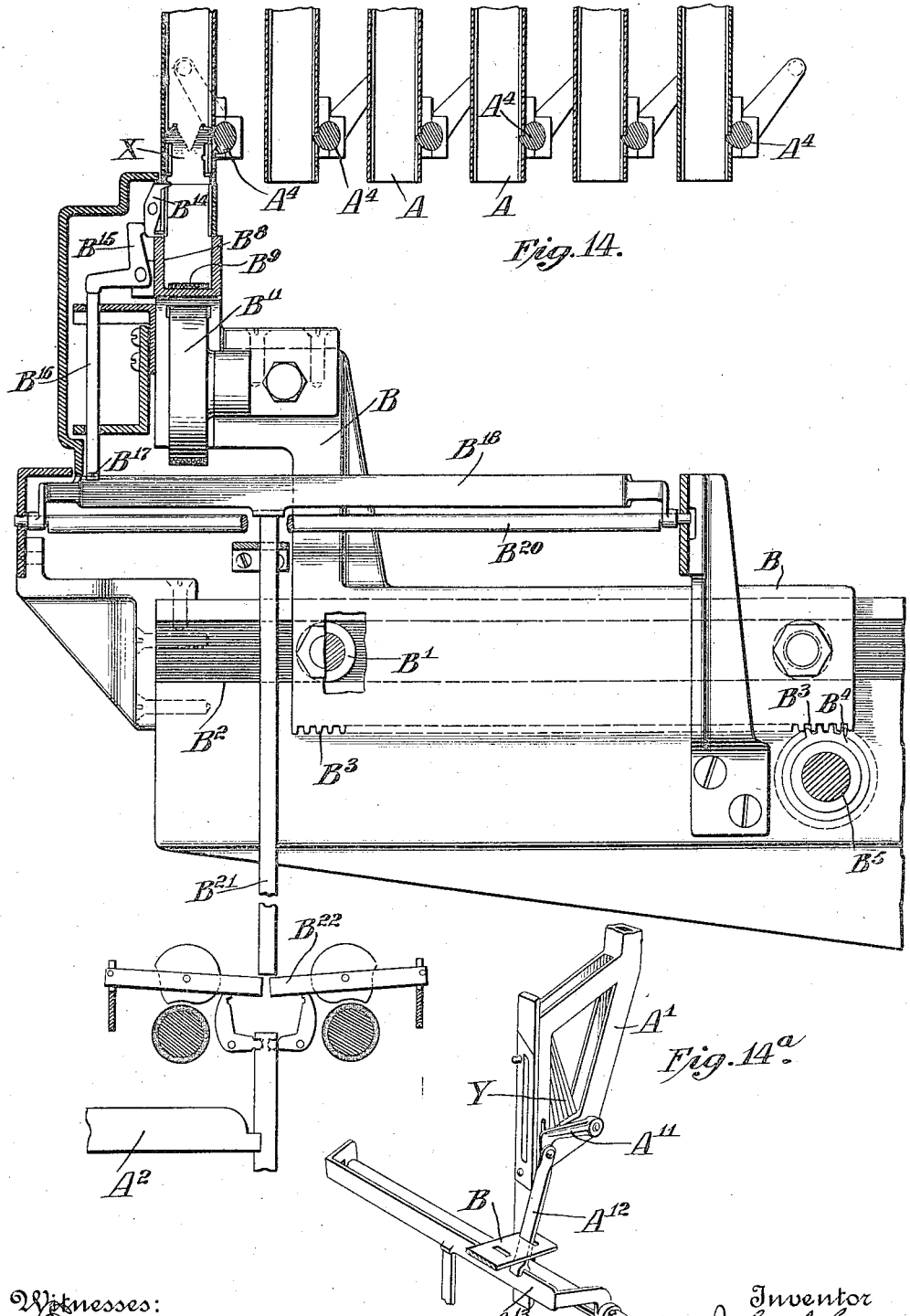
Figure 15:
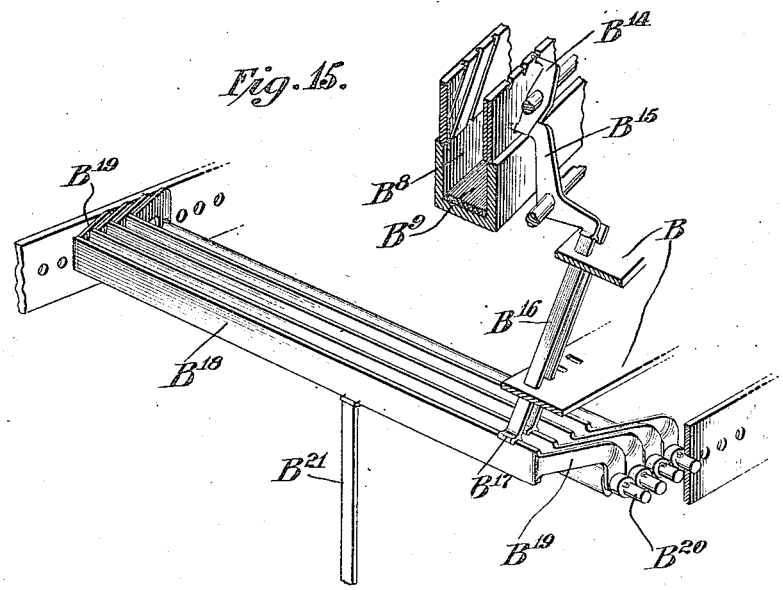
Figure 16:
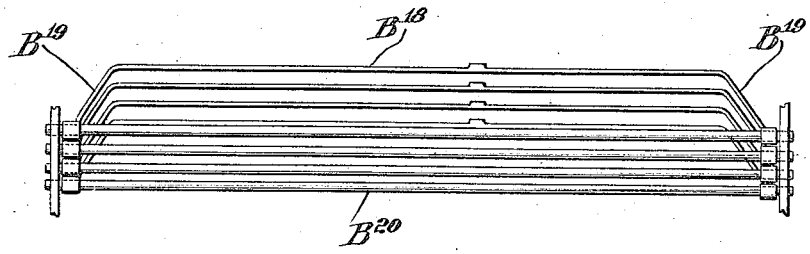

In the accompanying drawings: Figure 1 is a front elevation of a linotype machine, with my improvements embodied therein; Fig. 2 is a sectional plan, on an enlarged scale, taken approximately on the line 2—2 of Fig. 3.; Fig. 3 is a vertical section taken substantially on the line 3—3 of Figs. 1 and 2; Fig. 4 is a vertical section taken substantially on the line 4—4 of Figs. 1 and 2; Fig. 5 is a left-side elevation, partly broken away and in section, and certain of the parts being omitted; Fig. 6 is a front elevation of the molds, etc., on an enlarged scale; Fig. 7 is a right-side elevation showing the mechanism for raising and lowering the elevator; Fig. 8 is a diagrammatic edge view of the magazines, distributing tubes, etc.; Fig. 9 is a sectional detail thereof; Fig. 10 is a section showing distributer tubes of different size; Fig. 11 is a perspective detail of several tubes in operative position; Fig. 12 is a perspective detail of a single tube; Fig. 13 illustrates the variant form of the matrices employed; Fig. 14 is a sectional view, on an enlarged scale, showing the shiftable assembler devices, the matrix escapement actuating connections, etc., taken substantially on the line 14—14 of Fig. 2; Fig. 14[a] is a perspective detail of the spacer escapement actuating connections; Fig. 15 is a perspective detail of the escapement actuating connections, etc.; Fig. 16 is a detail illustrating the mounting of the escapement bails; and Fig. 17 is a vertical section, on an enlarged scale and partly broken away, of the assembler devices, etc., the section plane being generally that indicated by the line 17—17 of Fig. 2.

The matrices are stored in the magazines A and are released therefrom one at a time by the operation of the finger keys $A^2$. Similarly the justifying spacers are stored in the magazine $A^1$ and released therefrom by the operation of the key $A^{10}$. After the slug is cast, the assembled line is transferred to the top of the machine, in the manner subsequently to be described, at which point the spacers pass downwardly through the tube $A^5$ and are returned to their magazine, while the matrices move laterally to the distributing screws $A^6$ from which they pass through the distributing tubes M and are delivered to the appropriate magazines.

The magazines A, six of which are disclosed by way of example, are disposed in an upright position, and the assembling devices, etc., are adjustable transversely beneath their lower ends, so as to bring them into operative relation to the desired one. In this way any one of the several magazines and the contained fonts may be selected and brought into use.

The magazines are preferably suspended at their upper ends, as by the slideway $A^7$ (see Fig. 8), so as to be longitudinally removable, and therefore replaceable and interchangeable at will, and are further provided with handles $A^8$ (Fig. 1) to facilitate their manipulation. The magazines are of irregular outline, and are formed internally with the inclined, and preferably parallel, grooves or channels $A^3$ (see Fig. 17), the inclination of which directs the matrices toward the composing point, and also frictionally checks the speed of the matrices passing from the distributing mechanism and lessens their impact as they strike the already delivered matrices. Each magazine is also provided with locking means, preferably in the form of the well-known locking rock shafts $A^4$, $A^4$ shown in Figs. 8 and 14, whereby the matrices may be firmly secured in the inoperative magazines, and freed in the selected one to permit their delivery by the escapements.

The raceway or assembling channel $B^8$, which receives the matrices from the magazines, the assembler belt $B^9$, the escapements $B^{14}$ and a portion of their actuating devices, the assembler proper C, and the star wheel $C^1$, etc., are all carried by the transversely movable frame B, so that the assembling means in their entirety may be brought into operative relation to any selected one of the magazines. The frame B may be of any suitable construction, but is preferably in the form best illustrated in Fig. 14, it being provided with supporting rollers $B^1$ which travel in grooves $B^2$ in the stationary framework. Also connected to the frame at its opposite sides are racks $B^3$, which engage pinions $B^4$ upon the shaft $B^5$, the latter (Fig. 1) being connected by gearing $B^6$ to an operating handle $B^7$, to permit the manual adjustment of the frame B and the selection of the desired magazine.

The assembling belt $B^9$ is located in the raceway $B^8$ (Fig. 17) and delivers the matrices therefrom through the passage $B^{10}$ into the assembler C and in front of the star wheel $C^1$. The belt $B^9$ passes over and is driven by the belt pulleys $B^{11}$ (see also Fig. 1) and the customary actuating connections $B^{12}$, one of the belt pulleys being splined as at $B^{13}$ to its shaft, to effect the constant movement of the belt regardless of the position of the frame B.

The escapements $B^{14}$ (Figs. 14 to 17) are carried by and work into the channel $B^8$, their pawls being so located as to engage and control the release of the matrices from the selected magazine, when the channel $B^8$ is moved into registration therewith, and the corresponding rock shaft $A^4$ operated to unlock the matrices therein. Mounted in proximity to the escapements $B^{14}$ are the actuating bell crank levers $B^{15}$, which in turn are engaged by the upper series of reeds $B^{16}$. As the levers $B^{15}$ and reeds $B^{16}$ are mounted in and travel with the frame B, and as it is necessary that the escapements be actuated in all of their several adjusted positions, the lower ends of the reeds $B^{16}$ are forked as at $B^{17}$ and rest upon and slidingly engage the bails $B^{18}$ pivotally mounted in the stationary framework, so that the operation of the bails effects the actuation of the escapements in all of their several positions. The bails $B^{18}$ are preferably constructed of a central longitudinal portion and angularly inclined end arms $B^{19}$, which extend laterally and are pivotally mounted upon the ends of the rods $B^{20}$, the construction described permitting their convenient nesting or basketing, as best shown in Figs. 15 and 16.

The bails $B^{18}$ are swung about their pivots by the lower series of reeds $B^{21}$, which are actuated from the ordinary keyboard mechanism $B^{22}$ (Fig. 14) and are under the control of the finger keys $A^2$. In other words, the escapements and their actuating devices $B^{15}$ and $B^{16}$ are carried by the movable frame B, while the devices $B^{18}$, $B^{21}$, $B^{22}$, and keys $A^2$ are mounted in the stationary framework. The magazine $A^1$ for the spacers Y is also carried by the frame B, and its escapement actuating devices (Fig. 14$^a$) therefore comprise the actuating arm $A^{11}$ and connected reed $A^{12}$ carried by the movable frame, the reed $A^{12}$ being forked at its lower end to engage slidingly with the bail $A^{13}$, which is controlled from the key $A^{10}$ (Figs. 3 and 4), the several parts coöperating in a manner substantially similar to that already described in connection with the matrix escapements.

As previously stated, the line of matrices and spacers is composed in the assembler C in front of the star wheel $C^1$, the forward end of the line being supported therein by a yielding resistant, which may be of any approved form or construction, such for instance as disclosed in my previous U. S. Letters Patent, No. 734,096, and as this feature in itself constitutes no portion of my present invention, it is indicated only by dotted lines in Fig. 17.

After the line is composed it is transferred from the assembler C to the intermediate channel D (see Figs. 1 and 2) by devices subsequently to be described. The channel D is mounted upon the slide D² and is formed with the lug D¹, which projects laterally beyond the channel and into the path of the assembler C, so that the position of the latter governs that of the former and insures their registration at the necessary time. After the line is received by the channel D, the latter moves rearwardly into registration with the carrier or elevator E, and the line is transferred thereto by mechanism also subsequently to be described. The means for imparting the necessary movements to the slide D² and the intermediate channel D comprise (Figs. 2 and 4) the link D³, lever arm D⁵ and cam D⁶ on the main shaft F⁹, the link D³ being telescopic in its construction and provided with a spring D⁴ between its parts to allow for lost motion in one direction. This arrangement insures the positive rearward movement of the channel D always to the same position in relation to the elevator E, but permits a yield in the opposite direction, when the lug D¹ engages the assembler C in any of the several positions thereof, and also allows the simultaneous adjustment of the assembler and channel, when the frame B is shifted. In other words, the spring D⁴ tends to maintain the link D³ wholly distended so as to move the intermediate channel D to its foremost position, but such movement of the intermediate channel will be resisted and prevented by its engagement with the assembler when the latter is in any of its rearmost positions, the spring in this event permitting the parts to yield. In the same way when the assembler is moved rearwardly from its foremost position it will carry with it the intermediate channel, the spring D⁴ yielding as before to permit such movement of the intermediate channel independently of its operating means.

The means for transporting the composed line from the assembler C to the channel D (see Figs. 2, 3, 4 and 17) comprise the slide F, which is bifurcated to straddle the star wheel C¹ and thus to be out of the way during composition. Pivotally connected to the slide is the arm F¹, which is manually moved by the operator at the required time, not only to transfer the line, but also to initiate the automatic actuation of the machine. The arm F¹ is telescopic and is mounted upon one end of the starting rock shaft F³ by the pivot joint F², thus permitting the necessary adjustment of the arm F¹ with the assembler C and channel D in all of the several positions of the frame B. On the opposite end of the rock shaft F³ is the arm F⁴, forked at its outer end and engaging a collar F⁵ upon the shaft F⁶, so that when the transfer arm F¹ is moved, the shaft F⁶ will be shifted longitudinally and the power applied, in substantially the manner set forth in my U. S. Letters Patent No. 734,096. The spring F¹⁰ connected to the arm F⁴ serves to restore the parts to their normal position, when the arm F¹ is released by the operator. Upon the shaft F⁶ is mounted the pinion F⁷, which meshes into a gear F⁸ on the main shaft F⁹, whereon are also mounted the cams which effect or control the several automatic operations.

As before stated, after the line is transferred to the channel D, the latter is moved to its rearmost position, by the mechanism before described, into registration with the elevator E. The line is then transferred from the channel to the elevator by the slide G, which is shifted in one direction (Figs. 1, 2 and 4) by the link G¹, arm G², rock shaft G³, arm G⁴, and side cam G⁵ on the main shaft F⁹, and in the opposite direction by the spring G⁶ connected to the shaft G³.

After the line is transferred to the elevator E, it is brought thereby into casting relation to the mold H, the elevator being carried by the frame E¹ pivotally mounted at E² at the upper portion of the machine frame. The means for swinging the frame, and thus moving the elevator into operative relation to the mold, comprise (Figs. 2 and 5) the link E³ connected to the lower portion of the frame, which is shifted in one direction by the peripheral cam E⁴ on the shaft F⁹, and in the opposite direction by the spring E⁵.

After the last-mentioned or casting movement of the elevator E, and when the frame E¹ is swung outwardly again, the elevator is given a second or upward movement to convey the composed line to the distributing mechanism. To this end the elevator E is slidingly mounted upon the frame E¹, and the devices for shifting it vertically (see Figs. 1, 3, 5 and 7) comprise the link E¹⁰, the elongated and bent lever arm E¹¹, the connected short lever arm E¹², the link E¹³, the rock arm E¹⁴, the rock shaft E¹⁵, the rock arm E¹⁶, and the link E¹⁷ connected to the pitman E¹⁸. The pitman E¹⁸ is connected at one end by a pin-and-slot connection E²⁰ to the disk E¹⁹ mounted upon the farther end of the main shaft F⁹, the pin-and-slot connection permitting a sufficient dwell of the elevator in its upper position to allow the transfer of the line therefrom before it again descends to normal position.

The mold H is also pivotally arranged, so as to permit its being swung into operative relation to the stationary pot H⁴⁰ prior to the advance of the elevator, and its retraction therefrom after the retreat of the elevator. To this end the mold is mounted upon the frame H² pivotally connected at H³ to the machine frame. The means for effecting the swinging of the frame about its pivot (Figs. 2, 3 and 5) comprise the link H⁴, which is moved in one direction by the spring $H^5$, and in the opposite direction by the peripheral cam $H^6$ on the shaft $F^9$.

The machine is preferably equipped with a plurality of molds H of different sizes, any one of which may be brought into action at will. The particular construction of the molds constitutes no part of my present invention, although for purposes of illustration I have shown them (Fig. 6) as provided with a stationary jaw $H^{25}$ and a movable jaw $H^{26}$, between which the line is held during the casting operation. The several molds H are superposed and supported by the shift frame $H^1$ slidably mounted in the previously-mentioned pivoted frame $H^2$, so as to permit the adjustment of the frame $H^1$ with reference thereto. The adjusting means comprise (Figs. 1, 2, 5 and 6) the depending rack $H^{10}$ passing through and normally connected to the block $H^{11}$. The block carries the adjusting pinion $H^{18}$ meshing into the teeth of the rack $H^{10}$, the connected adjusting handle $H^{19}$, and the pawl and ratchet $H^{20}$ to prevent backlash and hold the parts in adjusted relation to the block $H^{11}$. By these means any one of the molds may be brought into operative position at will.

After the slug is cast, and the frame $H^2$ swings outwardly, the frame $H^1$ is given a slight upward movement on the frame $H^2$ to bring the slug into operative relation to the trimming knives J and $J^1$. The means for effecting this movement comprise (Figs. 1, 2, 5 and 6) the arm $H^{12}$ engaging beneath the block $H^{11}$, the rock shaft $H^{13}$, the arm $H^{14}$ thereon, and the cam $H^{15}$ on the main shaft $F^9$. These parts are so arranged and proportioned as to elevate the mold, permit a dwell in the ejecting position, and then restore the mold to its lower or normal position.

As is customary in machines of this kind, the line is justified by the expansible spacers prior to the casting, this being effected by the slide $H^{30}$ on the frame $H^2$, which slide is connected at its opposite ends to and operated by the justifying rods $H^{31}$ and $H^{32}$ (Figs. 1, 2, 3, 5 and 6), the first-mentioned rod $H^{31}$ being controlled by the spring-actuated lever $H^{33}$ and justifying cam $H^{34}$, and the other rod $H^{32}$ by the spring-actuated lever $H^{35}$ and justifying cam $H^{36}$, both cams being mounted upon the main shaft $F^9$, all in the manner well known to those skilled in the art. It will be noted that the levers $H^{33}$ and $H^{35}$ simply project beneath the ends of the rods $H^{31}$ and $H^{32}$ and thus operatively engage them, which mode of connection permits the free swinging movement of the frame $H^2$.

As previously mentioned, the pot $H^{40}$ which contains the molten metal is stationary, and the mold is moved into relation with it. The means for actuating the pump or plunger $H^{41}$ (Figs. 2, 3 and 5) comprise the double actuating arm or lever $H^{42}$, spring $H^{43}$, link $H^{44}$, lever arm $H^{45}$, and peripheral cam $H^{46}$ on the main shaft $F^9$, also in the manner familiar in the art.

When the mold H is raised into relation to the knives J (Figs. 1, 2, 3, 4 and 6), the slug is moved therefrom by an ejector blade between and partly through the knives, whereby its top and bottom are trimmed. The blade is carried by the slide $J^4$ connected by the link $J^6$ to the actuating arm $J^7$, which arm is moved operatively by the spring $J^8$ and retracted by the peripheral cam $J^9$ upon the main shaft $F^9$. When the ejector retreats, the slug remains between the knives J, and is then forced endwise between the transversely arranged trimming knives $J^1$ by the blade $J^5$, connected to which is the link $J^{12}$ and actuating arm $J^{13}$ on the rock shaft $J^{14}$, (Figs. 1 and 2) the latter being moved in one direction by the spring $J^{15}$, and in the other by the arm $J^{16}$ engaging the cam $J^{17}$ on the main shaft $F^9$.

The upper and lower transverse knives (Fig. 6) are connected respectively to the upper and lower knives J, in order to insure their conjoint and corresponding adjustment. The adjusting means therefor may be of any desired form, but are shown as comprising the movable block or follower $J^2$ connected to the upper movable knives and the handle $J^3$ for moving the parts to their desired position.

When the slug is passed between the knives $J^1$ by the blade $J^5$, it is delivered to the vertically reciprocated lift plate $K^2$, whereby it is elevated into the galley K beneath the slugs already contained therein, the galley being provided with inwardly acting retaining pawls $K^1$ beveled at their inner surfaces, so that the upward movement of the lift plate disengages the pawls and permits the delivery of the slug, after which they return to their engaging position when the plate descends. The lift plate $K^2$ is reciprocated by the link $K^3$ and suitable actuating connections therefor. The form and arrangement of these connections constitute no part of my present invention, and may be of any desired type, such as those disclosed for instance in U. S. Letters Patent to O. Mergenthaler, No. 347,629.

When the elevator E transports the composed line of matrices and spacers to the upper portion of the machine, they are removed therefrom by the transfer slide L, which is retracted (Figs. 3, 4 and 5) by the arm $L^1$, connected rock shaft $L^2$, rock arm $L^3$ thereon, and cam piece $L^4$ (shown by dotted lines in Fig. 5) upon the justifying cam $H^{34}$, and is moved operatively by the spring $L^5$ connected to the shaft $L^2$.

As the spacers and matrices pass laterally from the elevator, the former descend through the tube A⁵ and are restored to the spacer magazine A¹. In this connection, it should be noted that the tube A⁵ (Figs. 1 and 3) is formed in a plurality of parts which are telescopically arranged, thus permitting the necessary shortening and elongation of the tube, as the magazine A¹ is moved to different positions by the transverse adjustment of the frame B. The matrices are then delivered in the customary manner to the distributing mechanism comprising the screws A⁶, and are separated according to letter and delivered into the tubes M, whereby they are separated according to font and restored to the proper magazines A. The tubes M (Figs. 9, 11 and 12) are formed with the shoulders or deflectors M¹, the upper cuts or notches M², and the lower cuts or notches M³, and are provided with the tilting or straightening lips M⁴, and the several sets of matrices X (Fig. 13) are formed with the deflecting grooves X¹ and with the extended grooves X², all as disclosed in my previous Letters Patent No. 1,131,425, dated March 9, 1915, and the construction and operation of which features will not therefore be further described at this time. However, it should be noted that the tubes M are detachably and interchangeably mounted in the machine, this result being preferably obtained by the employment of the superposed transverse bars M⁵, which are secured to the framework in any suitable manner, as by the screws shown in dotted lines. The loosening of the bars M⁵ frees the tubes M and permits their longitudinal removal. This feature is of importance in the machine organization, in that it permits the ready interchange of the tubes and the convenient re-arrangement of the distributing elements. This capability is of advantage in adjusting the machine for composition in different languages, or for different or mixed fonts, or for display work, in which large characters may be called into action frequently. For instance, as indicated in Fig. 10, a wide tube may be substituted for one or more narrow tubes, and thereby the machines adapted to large or thick matrices in place of the ordinary or smaller ones, or vice versa.

The sequence of operations is briefly as follows: The selected magazine A is rendered active by the adjustment of the frame B, which moves the assembling devices and intermediate channel into operative relation thereto. The matrices and spacers are then composed in the assembler C, and the line is manually transferred to the channel D by the slide F, this action effecting also the initiation of the automatic machine operations. The channel D moves into registration with the elevator or carrier E, and the line is transferred from the former to the latter by the slide G, when the channel returns into alinement with the assembler. The mold frame moves inwardly to bring the selected mold H into operative relation to the fixed pot, and then the elevator frame swings inwardly to bring the carrier into operative relation to the mold. The pump is actuated and the slug is cast, after which the elevator frame and mold frame respectively swing outwardly to clear the parts. The mold H moves upwardly, and the slug is ejected therefrom, trimmed by the knives J and J¹, and delivered to the galley K, when the mold descends to normal position. The carrier E transports the composed line to the top of the machine, and the matrices and spaces are removed laterally therefrom by the slide L, and the elevator descends to normal position. During this lateral transfer the spacers pass downwardly through the tube A⁵ to their magazine A¹, while the matrices are delivered to the distributing mechanism, wherein they are first separated according to character and delivered to the tubes M, by which they are restored to their appropriate magazines.

As previously stated, I have shown my improved devices only in preferred form and by way of example, and in a special mode of adaptation, but obviously many modifications and alterations therein, and in their mode of application, will suggest themselves to those skilled in the art, without departure from the scope of the invention.

Having thus described my invention, its construction and mode of operation, what I claim and desire to secure by Letters Patent of the United States, is as follows:

1. In a typographical machine, the combination of a plurality of upright magazines arranged one behind another and having their lower ends terminating in the same fore-and-aft transverse plane, a raceway having a series of matrix channels, and a supporting frame therefor, the said supporting frame being mounted to slide horizontally in the machine frame to locate the raceway beneath one or another of the magazines.

2. In a typographical machine, the combination of a plurality of upright magazines arranged one behind another and having their lower ends terminating in the same fore-and-aft transverse plane, a raceway having a series of matrix channels, a supporting frame for the raceway mounted to slide horizontally in the machine frame to locate it beneath one or another of the magazines, and a conveyer belt carried by the supporting frame and arranged within the channeled raceway.

3. In a typographical machine, the combination of a plurality of upright magazines arranged one behind another and having their lower ends terminating in the same fore-and-aft transverse plane, a raceway having a series of matrix channels, a supporting frame for the raceway mounted to slide horizontally in the machine frame to locate it beneath one or another of the magazines, a conveyer belt carried by the supporting frame and arranged within the channeled raceway, and means for driving the belt in any of the different positions of the supporting frame.

4. In a typographical machine, the combination of a plurality of upright magazines arranged one behind another and having their lower ends terminating in the same fore-and-aft transverse plane, a raceway having a series of matrix channels, a supporting frame for the raceway mounted to slide horizontally in the machine frame to locate it beneath one or another of the magazines, a conveyer belt carried by the supporting frame and arranged within the channeled raceway, and driving means for the belt adapted to maintain their operative connection therewith during the movement of the supporting frame.

5. In a typographical machine, the combination of a plurality of upright magazines arranged one behind another and having their lower ends terminating in the same fore-and-aft transverse plane, a raceway having a series of matrix channels, a supporting frame for the raceway mounted to slide horizontally in the machine frame to locate it beneath one or another of the magazines, and a series of escapements carried by the supporting frame and adapted to control the delivery of the matrices from the selected magazine to the raceway.

6. In a typographical machine, the combination of a plurality of upright magazines arranged one behind another and having their lower ends terminating in the same fore-and-aft transverse plane, a raceway having a series of matrix channels, a supporting frame for the raceway mounted to slide horizontally in the machine frame to locate it beneath one or another of the magazines, a series of actuating devices carried by the supporting frame so as to be movable therewith, and escapement mechanism controlled by said actuating devices for releasing the matrices from the selected magazine.

7. In a typographical machine, the combination of a plurality of upright magazines arranged one behind another and having their lower ends terminating in the same fore-and-aft transverse plane, a raceway having a series of matrix channels, a supporting frame for the raceway mounted to slide horizontally in the machine frame to locate it beneath one or another of the magazines, a series of escapements carried by the supporting frame and adapted to control the delivery of the matrices from the selected magazine to the raceway, and a series of actuating devices for the escapements also carried by the supporting frame.

8. In a typographical machine, the combination of a plurality of upright magazines arranged one behind another, a raceway having a series of matrix channels, a supporting frame for the raceway mounted to slide horizontally in the machine frame to locate it beneath one or another of the magazines, a series of escapements carried by the supporting frame and adapted to control the delivery of the matrices from the selected magazine to the raceway, a keyboard mechanism, and connections therefrom to the escapements, the said connections adapted to permit the free and unimpeded movement of the supporting frame which carries the escapements therewith.

9. In a typographical machine, the combination of a plurality of upright magazines arranged one behind another, a raceway having a series of matrix channels, a supporting frame for the raceway mounted to slide horizontally in the machine frame to locate it beneath one or another of the magazines, escapement mechanism for releasing the matrices from the selected magazine, a series of escapement actuating devices carried by the supporting frame so as to be movable therewith, a keyboard mechanism, and connections therefrom to the escapement actuating devices, the said connections adapted to permit the free and unimpeded movement of the supporting frame.

10. In a typographical machine, the combination of a plurality of upright magazines arranged one behind another, a raceway having a series of matrix channels, a supporting frame for the raceway mounted to slide horizontally in the machine frame to locate it beneath one or another of the magazines, escapement mechanism for releasing the matrices from the selected magazine, a series of escapement actuating devices carried by the supporting frame, and a second series of actuating devices mounted independently of the frame and connected to the first series, the latter being movable with the supporting frame without becoming disengaged from the second series of actuating devices.

11. In a typographical machine, the combination of a plurality of upright magazines arranged one behind another, a raceway having a series of matrix channels, a supporting frame for the raceway mounted to slide horizontally in the machine frame to locate it beneath one or another of the magazines, escapement mechanism for releasing the matrices from the selected magazine, a series of escapement actuating devices carried by the supporting frame, a second series of actuating devices mounted independently of the supporting frame, and a series of intermediate bails to maintain the connection between the two series of actuating devices in any of the different positions of the supporting frame.

12. In a typographical machine, the combination of a plurality of upright magazines arranged one behind another, a raceway having a series of matrix channels, a supporting frame for the raceway mounted to slide horizontally in the machine frame to locate it beneath one or another of the magazines, escapement mechanism for releasing the matrices from the selected magazine, a series of escapement actuating devices carried by the supporting frame, a second series of actuating devices mounted independently of the supporting frame, and a series of intermediate bails through which motion from the second series is imparted to the first series, the latter being slidably engaged with the bails so as to maintain its connection therewith in any of the different positions of the supporting frame.

13. In a typographical machine, the combination of a plurality of upright magazines arranged one behind another, a raceway having a series of matrix channels, a supporting frame for the raceway mounted to slide horizontally in the machine frame to locate it beneath one or another of the magazines, escapement mechanism for releasing the matrices from the selected magazine, a series of escapement actuating devices carried by the supporting frame, a second series of actuating devices mounted independently of the supporting frame, and a series of intermediate bails to maintain the connection between the two series of actuating devices in any of the different positions of the supporting frame, the said bails being nested one within another, for the purpose described.

14. In a typographical machine, the combination of a plurality of magazines, an assembler wherein the line is composed and movable to different operative positions to correspond to one or another of the magazines, and a raceway having a series of channels to receive the matrices from the selected magazine and adapted to discharge them into the assembler.

15. In a typographical machine, the combination of a plurality of magazines, an assembler wherein the line is composed and movable to different operative positions to correspond to one or another of the magazines, a channeled raceway arranged between the selected magazine and the assembler, and a conveyer belt located in the raceway for delivering the matrices therefrom to the assembler.

16. In a typographical machine, the combination with a plurality of upright magazines arranged one behind another, of an assembler wherein the line is composed, a channeled raceway leading to the assembler, and a conveyer belt located in the raceway for delivering the matrices therefrom to the assembler, together with a supporting frame carrying all of said parts and arranged to slide horizontally to bring them into operative relation to one or another of the magazines.

17. In a typographical machine, the combination of a plurality of magazines, an assembler wherein the line is composed and movable to different operative positions to correspond to one or another of the magazines, a channeled raceway through which the matrices from the selected magazine pass to the assembler, and means for transferring the composed line of matrices from the assembler in any of its different positions.

18. In a typographical machine, the combination of a plurality of magazines, an assembler wherein the line is composed and movable to different positions to correspond to one or another of the magazines, means for transferring the composed line from the assembler in any of its different positions, and connections therefrom for initiating the automatic operations of the machine.

19. In a typographical machine, the combination of a plurality of magazines, an assembler wherein the line is composed and movable to different operative positions to correspond to one or another of the magazines, a channeled raceway through which the matrices pass from the selected magazine to the assembler, and means to receive the composed line from the assembler in any of its different positions.

20. In a typographical machine, the combination of a plurality of magazines, an assembler wherein the line is composed and movable to different operative positions to correspond to one or another of the magazines, means to receive the composed line from the assembler and movable therewith to corresponding positions, and a channeled raceway through which the matrices pass from the selected magazine to the assembler.

21. In a typographical machine, the combination of a carrier to present the composed line to the mold, and a transfer channel through which the line is delivered to the carrier and movable into operative relation thereto.

22. In a typographical machine, the combination of the matrix-carrier to present the composed line to the mold, and the intermediate channel movable backwardly and forwardly into and out of operative relation thereto.

23. In a typographical machine, the combination of the assembler wherein the line is composed and movable to different operative positions, and the intermediate channel to receive the composed line therefrom and movable to corresponding positions, the said channel being movable to a still different position to permit the transfer of the line therefrom.

24. In a typographical machine, the combination of the assembler wherein the line is composed and movable to different operative positions, the intermediate channel to receive the composed line therefrom and movable to corresponding positions, and also movable to a still different position, and means for transferring the line from the channel in its last-mentioned position.

25. In a typographical machine, the combination of the assembler, the matrix-carrier to present the composed line to the mold, and the intermediate channel through which the composed line is transferred from the assembler to the carrier and movable from one to the other.

26. In a typographical machine, the combination of the assembler, the matrix carrier to present the composed line to the mold, and the intermediate channel through which the composed line is transferred from the assembler to the carrier, with means for moving the channel back and forth between the assembler and carrier.

27. In a typographical machine, the combination of the assembler, the matrix carrier, and the intermediate channel, with means for moving the channel back and forth between them, the said channel being also movable independently of the said means for the purpose described.

28. In a typographical machine, the combination of the assembler wherein the line is composed and movable to different positions, the intermediate channel to receive the composed line therefrom and movable to corresponding positions, the matrix carrier, and means for moving the intermediate channel into operative relation to the carrier from any one of its different receiving positions.

29. In a typographical machine, the combination of a mold, distributing mechanism, a carrier movable back and forth between them, a supporting frame in relation to which the carrier is movable, and automatic means for moving the frame toward and from the mold so as to move the carrier into and out of engagement therewith.

30. In a typographical machine, the combination of a mold, distributing mechanism, a carrier movable back and forth between them, a supporting frame upon which the carrier is movable, the said frame being pivoted at its upper end so that the carrier may be swung into and out of engagement with the mold, and automatic means for effecting the swinging of the frame.

31. In a typographical machine, the combination of a melting pot, a mold supporting frame movable toward and from the pot, line justifying devices carried by the frame, and operating means therefor adapted to be connected to and disconnected from the justifying devices as they move toward and from the pot.

32. In a typographical machine, the combination of a mold wherein the slug is cast, a galley, an ejector for removing the slug from the mold edgewise, and a pusher for moving the ejected slug endwise toward the galley for delivery thereto.

33. In a typographical machine, the combination of a plurality of magazines, distributing mechanism adapted to release matrices at different points in its length, and a series of intermediate conductors along which the released matrices travel and provided with means for deflecting them into one or another of the magazines according to form, the said conductors being interchangeable in position with each other, for the purpose described.

34. In a typographical machine, the combination of a plurality of magazines, distributing mechanism adapted to release matrices at different points in its length, and a series of intermediate conductors along which the released matrices travel and provided with means for deflecting them into one or another of the magazines, according to form, the said conductors being independently removable from the machine, for the purpose described.

35. In a typographical machine, the combination of a magazine, distributing mechanism adapted to release matrices at different points in its length, and a series of intermediate conductors along which the released matrices travel to the magazine, the said conductors being of different sizes and interchangeable in position with each other.

36. In a typographical machine, the combination of a magazine, distributing mechanism adapted to release matrices at different points in its length, and a series of intermediate conductors along which the released matrices travel to the magazine, the said conductors being of different sizes and removable independently from the machine, for the purpose described.

37. In a typographical machine, the combination of a plurality of magazines for the type of matrices capable of independent use, a scraper magazine movable to different operative positions to correspond to one or another of the magazines, and means for returning the spacers to their magazine in any of its different positions.

38. In a typographical machine, the combination of assembling devices movable to different operative positions, a spacer magazine movable to corresponding positions, and means for returning the spacers to their magazine in any of its different positions.

39. In a typographical machine, the combination of assembling devices movable to different operative positions, a spacer magazine movable therewith to corresponding positions, and means for returning the spacers to their magazine in any of its different positions.

40. In a typographical machine, the combination of a movable supporting frame, assembling devices carried thereby, a spacer magazine also carried by the frame so as to be movable with the assembling devices, and means for returning the spacers to their magazine in any of its different positions.

41. In a typographical machine, the combination of assembling devices movable to different operative positions, a spacer magazine movable to corresponding positions, means for delivering the spacers from the magazine irrespective of its position, and means for returning the spacers to their magazine in any of its different positions.

42. In a typographical machine, the combination of assembling devices movable to different operative positions, a spacer magazine movable to corresponding positions, a finger key for controlling the release of spacers from the magazine, and means for returning the spacers thereto, the said finger key and returning means maintaining their connection with the magazine irrespective of its position.

43. In a typographical machine, the combination of a plurality of upright magazines arranged one behind another, assembling devices movable forwardly and backwardly into operative relation to one or another of the magazines, a spacer magazine movable to corresponding positions and provided with an escapement to control the release of the spacers therefrom, and actuating devices connected to the escapement and adapted to maintain their connection therewith in any of the different positions of the magazine.

44. In a typographical machine, the combination of a plurality of upright magazines arranged one behind another, with assembling devices movable forwardly and backwardly into operative relation to one or another of the magazines, the said devices including an assembler wherein the line is composed and a channeled raceway through which the matrices pass from the selected magazine to the assembler, together with a spacer magazine located above the assembler in position to discharge the spacers thereinto and movable backwardly and forwardly with the assembling devices so as to maintain its operative relation to the assembler in any of its different positions.

45. In a typographical machine, the combination of a spacer magazine movable to different operative positions, and a delivery tube connected thereto, the said tube being telescopic to permit the movement of the magazine and to insure the return of the spacers thereto irrespective of its position.

46. In a typographical machine, an upright channeled magazine having all its channels inclined laterally with respect to its receiving end.

47. In a typographical machine, a channeled magazine having all its channels inclined laterally with respect to its receiving end and all extending in the same direction.

48. In a typographical machine, a channeled magazine having all its channels inclined toward the composing point.

49. In a typographical machine, the combination of a fixed melting pot, a series of molds movably arranged so that any selected one thereof may be brought into operative relation to the pot, a supporting frame wherein the molds are mounted and movable toward and from the pot so as to move the selected mold into and out of engagement therewith, a carrier to present the composed line to the mold, and a supporting frame for the carrier, the said carrier supporting frame being movable toward and from the selected mold so as to move the composed line into and out of engagement therewith.

50. In a typographical machine, the combination of a fixed melting pot, a mold to coöperate therewith, a matrix carrier to present the composed line to the mold, and two supporting frames, one for the mold and the other for the matrix carrier, the said supporting frames being each pivotally mounted at its upper end; for the purpose described.

51. In a typographical machine, the combination of a series of molds adjustable vertically to bring any selected one into casting position, a galley to receive the slugs cast in the selected mold and located above the casting position, a pair of trimming knives between which the successive slugs are moved for delivery to the galley, and means for moving the selected mold vertically after casting into operative relation to the trimming knives.

52. In a typographical machine, the combination of a mold wherein the slugs are cast, a galley to receive the slugs therefrom, and two pairs of trimming knives located between the mold and galley and arranged transversely with reference to each other so as to trim the slugs both crosswise and lengthwise, and means for moving the slugs from the mold to the galley through the two pairs of trimming knives successively.

53. In a typographical machine, the combination of a mold wherein the slugs are cast, a galley to receive the slugs therefrom, means for moving the successive slugs from the mold to the galley, and means for trimming the individual slugs both crosswise and lengthwise thereof during their travel from the mold to the galley.

54. In a typographical machine, the combination of a mold wherein the slugs are cast, a galley to receive the slugs therefrom, two pairs of trimming knives located between said parts, and means for moving the successive slugs from the mold to the galley through the two pairs of knives, the said means including an ejector for removing the slug edgewise from the mold and for pushing it between one pair of knives and a second ejector for pushing said slug endwise between the second pair of knives and into the galley.

In testimony whereof I have affixed my signature in presence of two witnesses.

JOHN R. ROGERS.

Witnesses:
D. S. KENNEDY,
ALFRED W. F. GUEST.